United States Patent
Kriegman (10) Patent No.: US 7,209,181 B2
(45) Date of Patent: Apr. 24, 2007

(54) SYSTEM AND METHOD FOR COMPOSITING OF TWO OR MORE REAL IMAGES IN A CINEMATOGRAPHIC PUPPETRY PRODUCTION

(76) Inventor: Mitchell Kriegman, 59 Horatio St., New York, NY (US) 10014

( * ) Notice: Subject to any disclaimer, the term of this patent is extended or adjusted under 35 U.S.C. 154(b) by 0 days.

(21) Appl. No.: 09/782,329

(22) Filed: Feb. 13, 2001

(65) Prior Publication Data
US 2002/0191109 A1    Dec. 19, 2002

Related U.S. Application Data

(63) Continuation of application No. 09/537,529, filed on Mar. 29, 2000.

(60) Provisional application No. 60/187,814, filed on Mar. 8, 2000.

(51) Int. Cl.
    *H04N 9/74* (2006.01)

(52) U.S. Cl. .................... 348/586; 348/584; 348/587; 348/722; 348/239

(58) Field of Classification Search .............. 348/586, 348/587, 592, 580, 581, 583, 239, 240, 552, 348/590, 591, 593, 722, 575, 576, 577; 352/54, 352/45; 345/435, 473; *H04N 9/74, 9/75*
See application file for complete search history.

(56) References Cited

U.S. PATENT DOCUMENTS

| 3,070,920 | A | * | 1/1963 | Bunin ........................ 352/54 |
| 3,691,676 | A | * | 9/1972 | Mellow ....................... 446/363 |
| 3,899,848 | A | * | 8/1975 | Bunin ......................... 352/54 |
| 3,981,097 | A | * | 9/1976 | Bunin ........................ 446/363 |
| 5,029,997 | A | * | 7/1991 | Faroudja ...................... 352/54 |
| 5,737,031 | A | * | 4/1998 | Tzidon et al. ............. 348/587 |
| 5,790,124 | A | * | 8/1998 | Fischer et al. ............. 345/435 |
| 5,923,400 | A | * | 7/1999 | Spector ....................... 352/45 |
| 6,034,740 | A | * | 3/2000 | Mitsui et al. ............... 348/587 |

* cited by examiner

*Primary Examiner*—Trang Tran
(74) *Attorney, Agent, or Firm*—Keith D. Nowak; Carter Ledyard & Milburn LLP (57) ABSTRACT

An improved cinematographic system and method for multiple compositing, within a virtual studio, of an image frame or image sequence of a real/action image of an action sequence of a puppet, with another image frame or image sequence of a real/action image of the same or another puppet, within a given virtual studio space. This system and method have application to the compositing of a master camera angle image and a close-up image of the same puppet character; and, to the compositing of a master camera angle image of one action puppet character with a second image from another camera angle of another puppet action character, so as to provide an interactive image sequence of each of the characters of each image within the same image frame.

2 Claims, 6 Drawing Sheets

Figure 6

SYSTEM AND METHOD FOR COMPOSITING OF TWO OR MORE REAL IMAGES IN A CINEMATOGRAPHIC PUPPETRY PRODUCTION

CROSS-REFERENCE TO RELATED APPLICATION

This application is a continuation-in-part of copending Utility patent Application, entitled AN IMPROVED METHOD AND APPARATUS FOR ENHANCED PUPPETRY OR SIMILAR TYPES OF PERFORMANCES UTILIZING A VIRTUAL SET, Ser. No. 09/537,529, filed on Mar. 29, 1999, which claims priority to Provisional Patent Application, entitled CGI ENHANCED PUPPETRY Ser. No. 60/187,814, filed on Mar. 8, 2000.

BACKGROUND OF THE INVENTION

1. Field of the Invention

This invention relates to a system and to a method for multiple compositing, within a virtual environment, of an image frame or image sequence of a puppet character, with an image frame or image sequence of a real/action image of the same or another puppet; and to a method for multiple compositing of such real/action images.

2. Description of the Prior Art

Puppet shows have existed since antiquity in almost all countries of the world. In most forms, the puppet is manipulated either directly by hand, or by rods, strings or wires. Shadows of puppets are also sometimes used in a performance.

Perhaps the most advanced form of puppetry is Bunraku Puppetry. This form was originally developed at the end of the sixteenth century in Japan, and later took its name from Uemura Bunrakuken, a famous Japanese promoter in the early nineteenth century. Bunraku puppetry requires teams of three to four puppeteers to stand behind each puppet and move the arms, legs, mouth and body using rods and the puppeteer's hands. Normally, there is a chief manipulator and two or more assistants to manipulate movement of the puppet. Since three or four people handle the different parts of the puppet, life-like motion cannot be achieved without precision timing among the manipulators. For all motions, there are detailed rules and forms to be followed. No manipulator is allowed to act on their own.

In Japan, when operating this type of puppet on stage, the manipulators, as a rule, wear black gowns and black hoods. This signifies that the puppet is the main performer with the manipulator remaining behind the scenes and/or blended into the background. In the Japanese theatrical tradition, black costumes represent the invisible or nothingness.

In the present-day video and film environment, puppetry has and continues to survive and thrive. More specifically, notwithstanding the advances made in animation, puppetry continues to provide more life-like and realistic action imagery. This is achieved, in part, by the skill of the puppeteers, advanced camera techniques, the digital processing of the real images and the compositing of the real and virtual images in the finished video/film sequences. One of the filming techniques that has permitted the advancement of this art form, and its adaptation to modern imaging media, is known in the film industry as the "blue screen or key-color process". More specifically, it is common practice to combine two or more images into a single scene. This technique of combining images is primarily achieved through use of a key-color process in which one image is photographed against a solid key-color background, (such as blue, green or grey) and the second image is substituted in place of that key-color background. It is also known that the background can be various other colors, and that the substitution can be made electronically, or through optical photographic techniques. This process is also known as the "keying" or the "Chroma key" process.

For example, it is commonplace to film an image of an announcer with a live camera (e.g. live image) in front of a blue screen, as a foreground image. Subsequently, a background image is generated in real time as a result of graphics processing performed by a high speed computer, and is super-imposed on the foreground image. The super-imposed portion of the background image and the foreground image is blanked out by the keying process and a composite image is obtained by fitting an object's image portion of the foreground image into the blank portion of the background image.

Although there are many advantages to using the standard key-color process, there are also several disadvantages. For example, the key-color process is generally an iterative process in which the end product, or combined file or video, is composited or "married in post" and is not viewable for evaluation until the entire process has been completed. As a result, film producers frequently view the end product and require changes to either the foreground or background portions, requiring that the entire sequence be "reshot". Furthermore, because the process is post rendered in real-time, it is difficult to perform actual interaction between a moving puppet, for example, and the puppet's environment. The normal cycle for "blue screen" film production can require several iterations of this process.

The following patents are representative of the relevant art and thus summarized below, to the extent believed related to the subject matter of the instant invention.

U.S. Pat. No. 4,689,683 (to Efron., issued Aug. 25, 1987) discloses an image compositing system that permits real-time composition and editing of the composite image, specifically, a real image filmed against a blue screen background with a background image or fill image. An example of such a system is where the background information is provided by filming a miniature model rather than a life-size scene. According to Efron, the actors carry forward their activities before a blue screen and the background information is supplied by a separate camera filming the miniature model. The eventual composite is formed by scaling the respective background and foreground inputs to provide appropriate proportions between the foreground objects and the background objects. In the Efron system, the motion of the camera filming the foreground objects or actors performances must be duplicated by the camera filming the background scene information. That is to say if an actor in the foreground filming moves to the right and the camera moves with the actor to display that motion, there must be a corresponding motion of the camera filming the miniature model in the example given. It is the function of camera filming the foreground image to provide this coordinated or slaved motion of the secondary camera.

The compositing of the an action and background image in real-time permits the television or film producer to display and view the scene as it is occurs. In addition, the image processing enhancements provided by Efron, permit the television or film producer to view the resultant composited scene as it is actually occurring and, as appropriate, modify, enhance or embellish that image information for compositing into a final completed scene depiction. The importance of this advantage cannot be over emphasized to real-time editing of the composite image. Moreover, the ability to evaluate the composited scene in real time completely eliminates any iterative process under which the previous cinematography blue screen processes functioned and the concomitant delay and expenses.

U.S. Pat. No. 5,479,597 (to Fellous, issued Dec. 26, 1995) discloses a virtual camera having a parametric model of a real camera forming part of a filming system. According to Fellous, the synthetic (virtual) images are obtained through a graphics computer equipped with image synthesizing software; and, a dynamic coupling between the two cameras, real and virtual, securing perfect coherence between each real image and each virtual image of a series of images. This dynamic coupling permits the control of the virtual camera by the real camera and vice versa. The Fellous' virtual camera, thus, permits a real image to be combined with a virtual set, thereby the creation of a composite image of life-like quality with relative modest facilities and expenses.

U.S. Pat. No. 5,764,306 (to Steffano, issued Jun. 9, 1998) discloses a method that allows the real-time replacement of the designated background portion of an incoming video signal with an alternate background. The Steffano method utilizes the actual background image for reference and as the basis for determining the background and foreground elements within the image, with the end result being comparable to traditional blue-screen processes, (such as in the Chroma-key and Ultimatte technology), but requires only a personal computer, video camera and the software. In Steffano method, the reference background image can be any reasonably static scene with a sufficient and stable light source captured by the camera. The video data stream is then modified in real-time by comparisons against the reference background image and is then passed onto its original destination. Multiple signal-noise processing algorithms are applied in real-time against the signal to achieve a visually acceptable matte.

U.S. Pat. No. 5,949,433 (to Klotz, issued Sep. 7, 1999) discloses a method for processing image data, wherein real image data generated by a camera is combined with synthesized image data, comprising the steps of generating camera positional data representing characteristics of said camera, including an indication of zoom control; generating a synthesized image in response to said positional data; and adjusting the perceived focus of said synthesized image in response to zoom control adjustments, so as to effect a focusing difference between a portion of said real image and a portion of said synthesized image. The image processing capability of the Klotz method, thus, allows for the film director to project a virtual image into or out of a scene, in proportion to the objects within the other objects within scene.

U.S. Pat. No. 6,034,740 (to Mitsui, et al., issued Mar. 7, 2000) discloses a simple and inexpensive non-volatile memory storage device having a keying system, which include a recorded image of an object and recorded images of a plurality of the background images, each of which has a corresponding view angle of a view point in a three-dimensional space to be imaged, and a view position of the view point therein. The background image from the plurality of background images stored in the memory device can be selectively read according to the view angle and the view position preliminarily defined in accordance with the image of the object. A Chroma-keying composition is performed between the background image and the image of the object thereby producing a composite image.

According to Mitsui, et al., because his system includes a plurality of background images which are preliminarily stored on a memory device, (for example a simple disk array unit), the Chroma-keying composition of a composite image does not use nor require advanced high-speed (high-performance) graphics processing and high-speed (high-performance) image processing. Consequently, a small computer such as a personal computer having an usual-performance (speed) CPU suffices as a controller for his system configuration. Therefore, Mitsui, et al., reports that both simplification of the system configuration and reduction in cost can be achieved without sophisticated skills and large-scale facilities.

Notwithstanding the advancements in image processing and composite image techniques, the application of such techniques to puppetry has yet to be applied to its full advantage. More specifically, the compositing of a real image of different puppets within a given action sequence, presents problems that have heretofore been insoluble. More specifically, the manipulation of a puppet character in the foreground of a virtual studio set by one team of puppeteers, will necessarily result in puppeteer cross of the action puppet character positioned behind it. Thus, the puppeteer manipulation of more than one puppet figure at the same time, on the same virtual studio set, has been severely limited by the very narrow spatial constraints within the virtual studio set, that is by essentially confining such puppets to a parallel plain on the virtual production set. These constraints, thus, prevent realistic/life-like interaction between two or more puppets within a given virtual studio space. Accordingly, there is and remains a continuing need to adapt and utilize virtual studio space more effectively to permit more realistic and life-like interaction of puppets within a given virtual studio, and yet avoid the interference therebetween associated with crossing by one puppet of the other.

OBJECTS OF THE INVENTION

It is the object of this invention to remedy the above as well as related deficiencies in the prior art.

More specifically, it is the principle object of this invention to provide a cinematographic system and method for enhancement of realistic action images of a puppetry video/film production by compositing of multiple real/action images within a given virtual studio space.

It is another object of this invention to provide a cinematographic system and method for enhancement of realistic action images of a puppetry video/film production by compositing of real/action images within a given virtual studio space, wherein an action puppet character is photographed from two different camera angles within a given space of virtual studio space and the images from each of camera angle selectively composited within a given image, or sequence of images, to provide an enhanced action sequence of the action puppet character.

It is a yet another object of this invention to provide a cinematographic system and method for enhancement of realistic action images of a puppetry video/film production by compositing of real/action images within a given virtual studio space, wherein each of two or more action puppet characters are each photographed with a different camera within a virtual studio space, the images from each of camera composited with a virtual background image and the resultant composited images integrated within a given image frame to provide complimentary or interactive an action puppet characters within the same image frame.

Additional objects of this invention include the composited real and virtual images prepared in accordance with the system and method of this invention.

SUMMARY OF THE INVENTION

The above and related objects are achieved by providing a system and method for the adaptation of image compositing techniques of cinematographic processes, to advanced puppetry techniques, specifically, the compositing of real/action images of one puppet with one or more real/action images of the same or another puppet.

In one of the preferred embodiments of this invention, a real/action image of a puppet is filmed on a virtual studio set with a first camera to record a master camera angle shot, and a second real/action image of the same puppet, in the same real/action sequence, is recorded with another camera at a different camera angle to provide a second camera angle shot (e.g. close-up shot of same puppet from different camera angle). In the filming of the master camera angle shot, the position of the first camera, within the virtual studio relative to the puppet action figure, is also recorded. The first recorded image/sequence (herein also "master shot") is composited with a suitable virtual background image. Similarly, the second recorded image/sequence is composited with a still image that has been digitally created (e.g. also referred to as "back plate"). Each of the two composited images, specifically, the image composite of the master shot and virtual background, and the image composite of the second image and back plate, are now combined so as to swap out different frames of various backgrounds for a given back plate of a given image frame, thereby integrating the two composited images within one scene.

In another of the preferred embodiments of this invention, two separate cameras are used to record complimentary real/action images and sequences of images of different puppet characters, wherein the action of each puppet character of one image/sequence is calculated to be interactive with the image/sequence of another puppet character (or group of puppet characters). Thus, the two separate and interactive image sequences are independently created and composited within the same virtual studio space without puppeteer congestion and/or cross of either of the puppets by another puppet, or by one of the puppeteers. This is achieved in essentially the same as above described, specifically, by partial integration of the compositing platforms (e.g. Ultimatte 9 and Ultimatte 8) compositing platforms, so that each composited image appears within a given a portion of an image frame, and each allocated area of the image frame adjusted to create depth and perspective of one composited image relative to the other. The Ultimatte™9 and Ultimatte™8 perform this synthesis of the two composited images via a proprietary software program, Cinefusion™, supplied with this equipment.

In another of the preferred embodiments of this invention, the compositing of the image of real/action images and image sequences from two different cameras is accomplished in real-time to permit each of the puppet characters to more closely coordinate their complimentary actions to the actions of one another.

DETAILED DESCRIPTION OF THE INVENTION INCLUDING PREFERRED EMBODIMENTS

Figure 1:
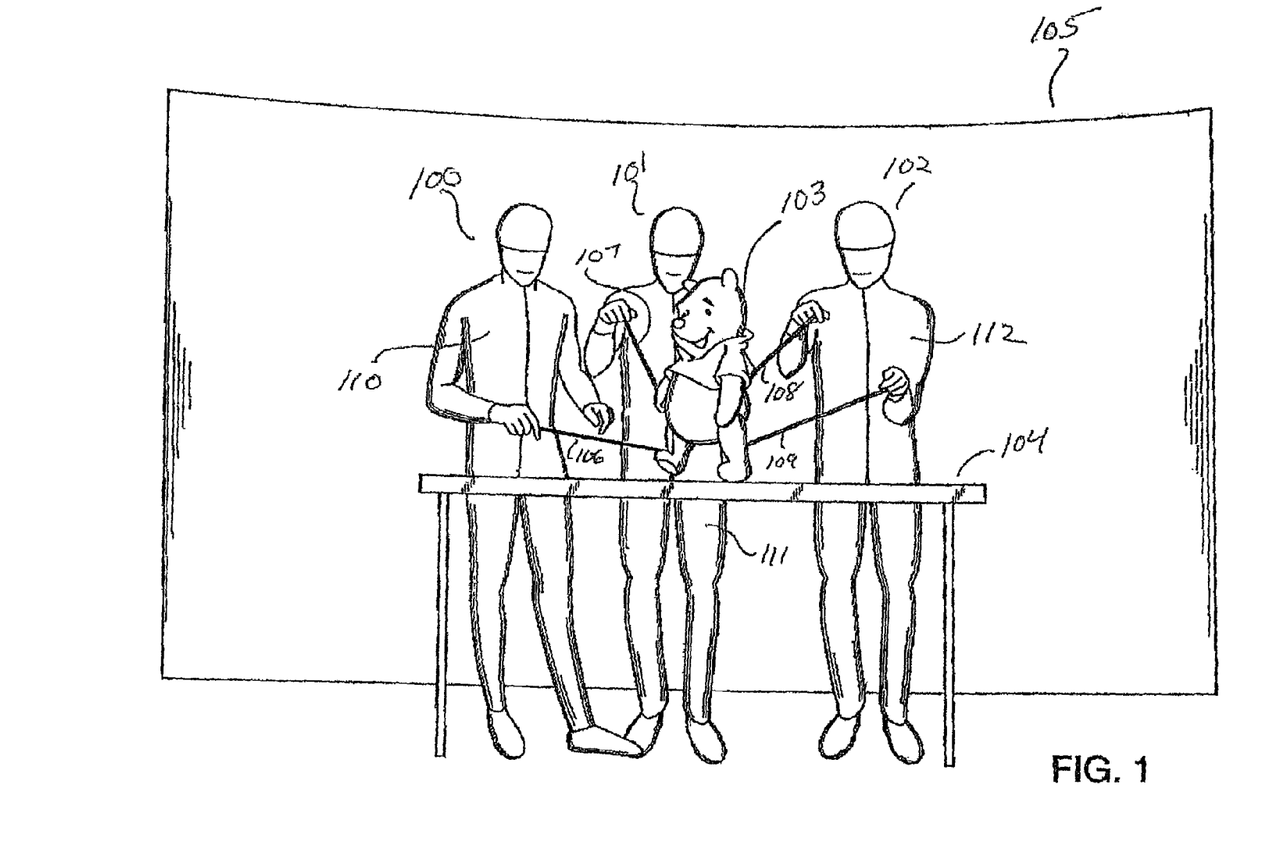
FIG. 1 depicts a virtual set used in the system and method of this invention.
Figure 2:
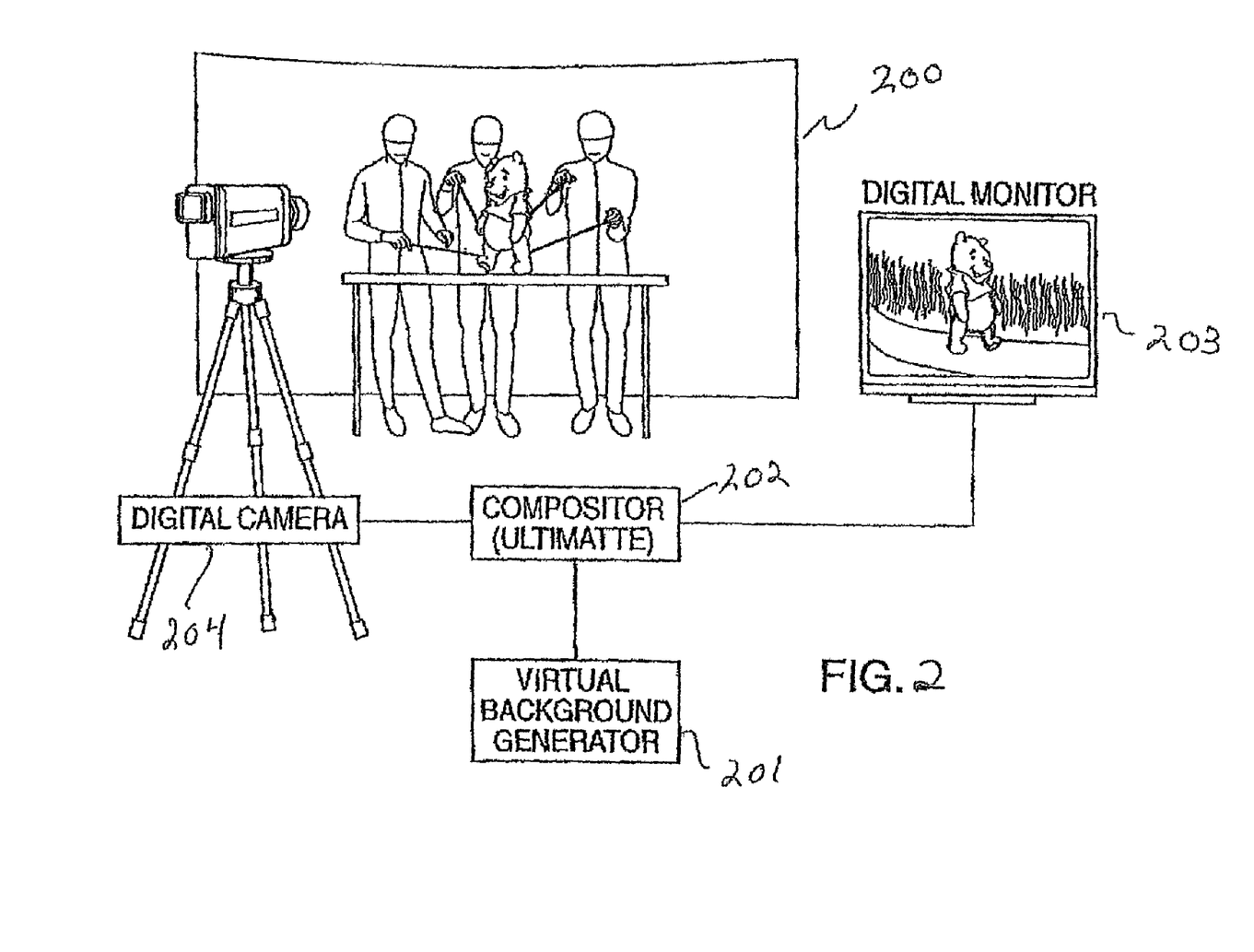
FIG. 2 depicts the system and method for compositing the real image of FIG. 1 and a virtual background image.
Figure 3:
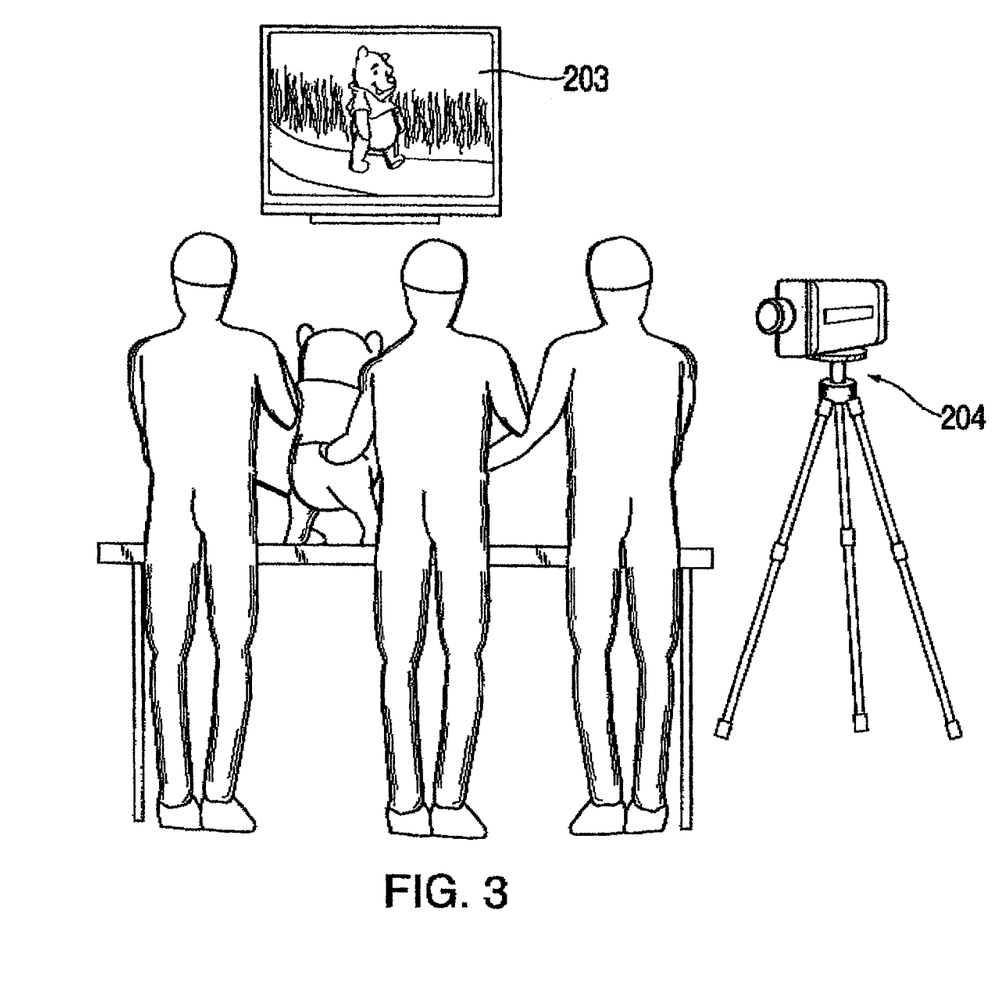
FIG. 3 depicts a rear view of the virtual set of the instant invention from a puppeteer perspective

The figures which appear herein, specifically, FIGS. 1, 2 & 3, are taken from commonly assigned Utility patent application Ser. No. 09/531,529, filed Mar. 29, 2000. The cinematographic image processing techniques (e.g. image compositing) referenced herein both in the Background of the Invention, and in the description that follows, are more fully described in U.S. Pat. Nos. 5,515,109 (to Vlahos, et al. May 7, 1996), U.S. Pat. No. 5,742,354 (to Vlahos, et al. Apr. 21, 1998), U.S. Pat. No. 5,831,685 (to Vlahos, et al. Nov. 3, 1998), and U.S. Pat. No. 5,971,544 (to Perry, issued Oct. 26, 1999) which are herein incorporated by reference in their entirety.

The invention described herein provides a simple and effective system and method for the adaptation of image compositing techniques employed in cinematographic processes, to advanced puppetry techniques, specifically, the compositing of real/action images taken with different cameras of the same puppet and/or of different puppets within the limited space of the virtual studio without interference or cross of one puppet by another or crossing of any of the puppet characters or production set props by any of the puppeteers.

Turning now to the specific embodiments of the invention illustrated herein, FIG. 1, depicts a virtual set in accordance with one embodiment of the invention directed to puppetry. More specifically, FIG. 1 depicts Bunraku puppetry wherein puppet 103 is an image of the Winnie The Pooh™ character and three (3) puppeteers/manipulators, 100, 101 and 102 operate the puppet in a life-like manner. The puppet rests on table 104, and the background consists entirely of key-color background screen 105. Rods 106–109, etc., are used by the puppeteers to control all movements of puppet 103.

Advantageously, as shown in FIG. 1, the puppeteers wear head-to-foot highly reflective keyable color suits, 110, 111 and 112. The suits include a hood, gloves, foot coverings and a piece of gauze, or similar material, over the eyes. The key-color of the material completely covering the puppeteers exactly matches the color of key-color screen 105. Similarly, table 104, rods 106–109, the studio floor, and all other objects in the set, except puppet 103, will exactly match the color of key-color screen 105.

In contrast, puppet 103 is designed and built with special care not to include colors in the body of the puppet that would match the key-color. Special care is taken to insure that puppet 103 does not include the key-color in its coloring or shading. The use of key-colored set props in the real/action scenes and sequences and the later compositing of the real/action scenes and sequences with a virtual image of the key-colored prop, permits greater puppeteer freedom of movement and interaction between the puppet and its environment, resulting in a more animated puppet and a more life-like action image.

Key-color screen 105 is typically in the shape of a hard cyclorama, which is built and painted a reflective keyable color. This color could be reflective green or blue, or even a highly reflective gray. A cyclorama is essentially a high wall that is curved at the base to eliminate any hard lines in the set that can cause shadows. Ideally, when filming the action of puppet 103, the "shoot" is into the curved corner of two cyclorama walls.

Table 104 is designed to be approximately thirty-six (36) inches high, but, of course, can be in various shapes and forms and multiple tables can be used. All tables to be used on the set can be adjusted for height and size, and would be painted the same keyable color as screen 105. As more fully described in reference to FIGS. 3, 4 & 5, the table can include one of more set props, and the puppet can be placed and/or manipulated on or around the set props.

This table and similar platforms are used by the puppeteers to simulate where the ground would be in the virtual set. The table gives the puppets, when they walk within the virtual set, something real to step on so the action of walking is believable. These tables may have a light source within the table to create a glow from below in order to further eliminate shadows where the characters touch the table surface. Reflective material may also be placed on the top of the tables.

The lighting strategies are very important to the success of the inventive technique. Successfully marrying two images in real time—the live puppets and a virtual background—without shadows or key-color problems, is the measure of success for the technical process. Suffused lighting that creates an overall lack of shadows is the base of the lighting techniques. The use of the glowing tables is a second key to eliminating shadows. The use of ultraviolet light is another technique that successfully places light in all shadow areas that the camera does not read because it does not register the frequency of ultraviolet light. Such lighting strategies are known, have been used with prior art key-color schemes, and will not be described herein in further detail.

Since all objects shown on the set in FIG. 1, except for puppet 103, are the exact same key-color as screen 105, it is to be understood that all such objects can be eliminated from a shot taken of the set shown in FIG. 1 utilizing known key-color techniques. Advantageously, in this way, puppet 103 will appear autonomous, free and independent of control of the puppeteers in the final filmed scene.

Referring now to FIG. 2, there is illustrated the manner in which a shot is actually taken of the set shown in FIG. 1. Set 200 is the same set as shown in FIG. 1. More specifically, a shot of the performance on the set is taken with digital camera 204, and the digital output of camera 204 is sent to video compositor 202. It is, of course, understood that a standard film or video camera could be used in place of a digital camera, with the performance being digitized in a well-known manner. This video compositor can be, for example, an Ultimatte™ device. The Ultimatte™ compositing technique has been used in video compositing for 20 years, is well-known in the art, and will not be described in further detail herein.

The virtual background to be combined with the actual performance, taken by digital camera 204, is generated by virtual background generator 201. Virtual backgrounds can be designed within a computer in any variety of virtual software programs. Elset and Maya are two examples, but this software is always changing and being innovated. What is key, is that the virtual system is a real time system that streams the set in real time so that the studio video switching system can composite both the live puppet image with the computerized virtual sets simultaneously. Typically, an Onyx (a high capacity, very fast computer) is used for this purpose, but there are several real time virtual composite systems on the market, all with different degrees of ease of use. The studio itself, to be used with the invention, as far as control room equipment is concerned, can be conventional, requiring tape machines, switchers and all the usual elements although maximized for good key-color technique.

After the outputs of digital camera 204, and virtual background generator 201 are combined in video compositor 202, the combined output is sent to digital monitor 203. Advantageously, what is shown on digital monitor 203 is only the movements of puppet 103 superimposed on the virtual background generated by virtual background generator 201. The puppeteers, which were controlling the puppet on the actual set, shown in FIG. 1, are completely eliminated from the final product, and only the puppet and the virtual background are visible.

FIG. 3 illustrates a rear view of the set in FIG. 1 showing what the puppeteers see while manipulating puppet 103. As indicated, the puppeteers can readily watch the finished product on monitor 203, while the action is taking place. Most importantly, since the final image is generated and composited in real time as the actual performance is shot by digital camera 204, the puppeteers can see the composited final image on the monitor in real time. Therefore, the puppeteers have the complete ability to interact with their environment, including any virtual and real objects in that environment and each other.

Figure 4:
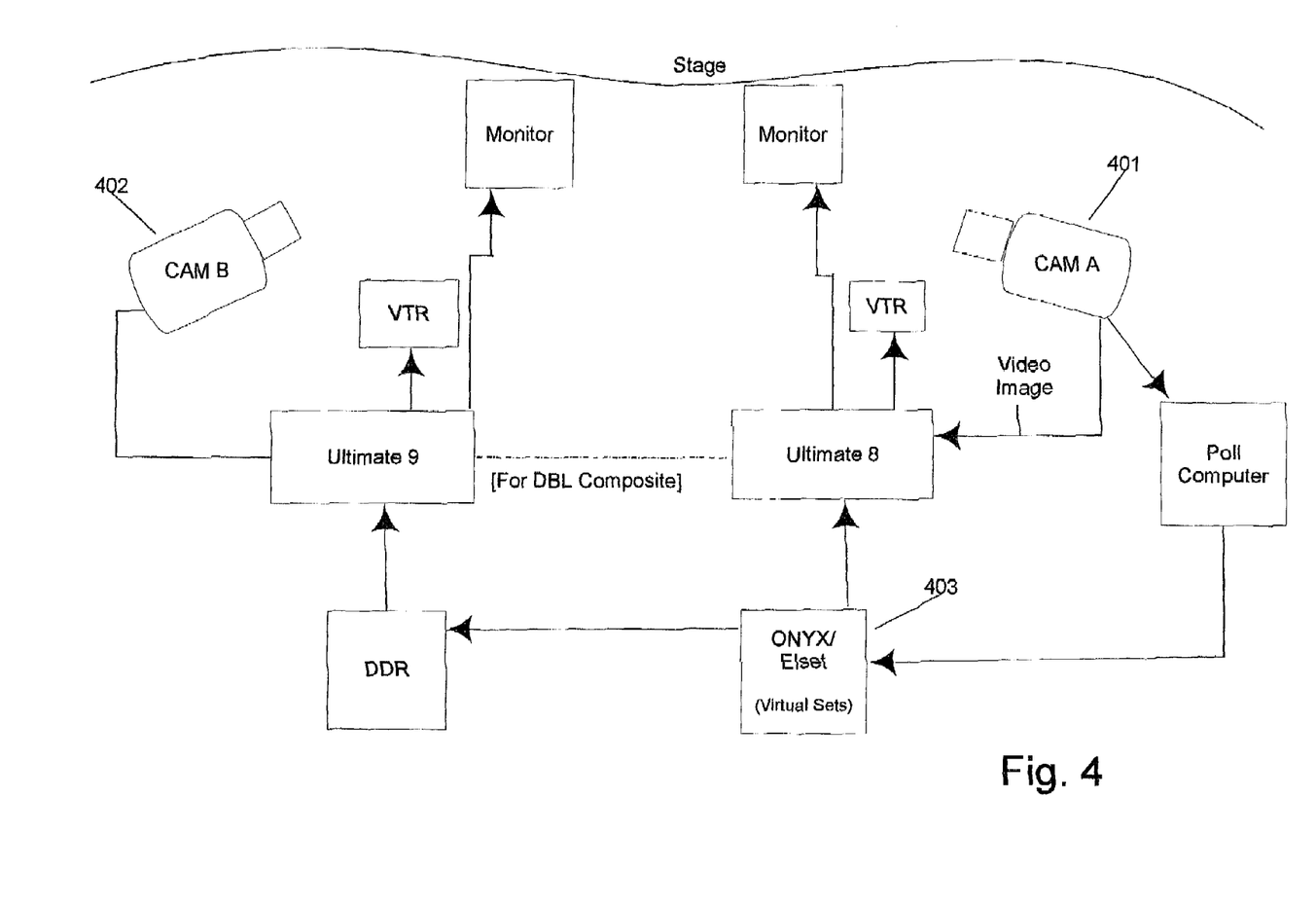
FIG. 4 depicts a virtual set in which two cameras are used to record an action image of the same puppet character from different camera angles, or alternatively, to record multiple action images of different action characters. In each instance, the separately recorded action images are further composited or integrated within a single scene or image frame.

Referring now to FIG. 4, there is illustrated a block diagram of the system of this invention wherein each of cameras 401 and 402 are focused upon the action figure of puppet character 103 manipulated by puppeteers 110, 111 & 112 (see FIG. 1). Camera 401 (for example, a Phillips Progressive Scan camera) is set at a camera angle relative to the puppet character 103 that is distinct from the camera angle of camera 402 (also a TV Video camera). As the puppeteer manipulation of the puppet character 103 takes place, the action image/sequence is recorded from each of the cameras at a different camera angle, in the case of close-up camera 402, at a different focal plain/distance from the puppet character. The camera system (401) also records/senses the camera position (angle, distance from the puppet character, effective focal length of the camera lens, and other "positional data" of the camera) relative to the puppet character for each recorded image frame of the master shot of the puppet character. As discussed hereinafter, this positional data is used in the compositing process for integration of each of the independently recorded images within a given image space or frame.

Each of the recorded images from each camera are first composited with a suitable background, as follows:
- in the case of the recorded image from camera 401, a virtual background scene/set is stored in Elset module 403, and
- in the case of the recorded image from camera 402, with a still image that has been digitally created by DDR module 404 (e.g. also referred to as a "back plate" image).

The images from each camera angle are combined by Ultimatte 8 and Ultimatte 9 units, so as to swap out different frames of various backgrounds for a given back plate of a given image frame, thereby integrating the two images within one virtual studio set. The resultant composite image, discussed in greater detail in reference to FIG. 5, of the close-up of the puppet character within the virtual background scene of the action sequence of the master shot, provides more cinematographic realism to the finished production.

Figure 5:
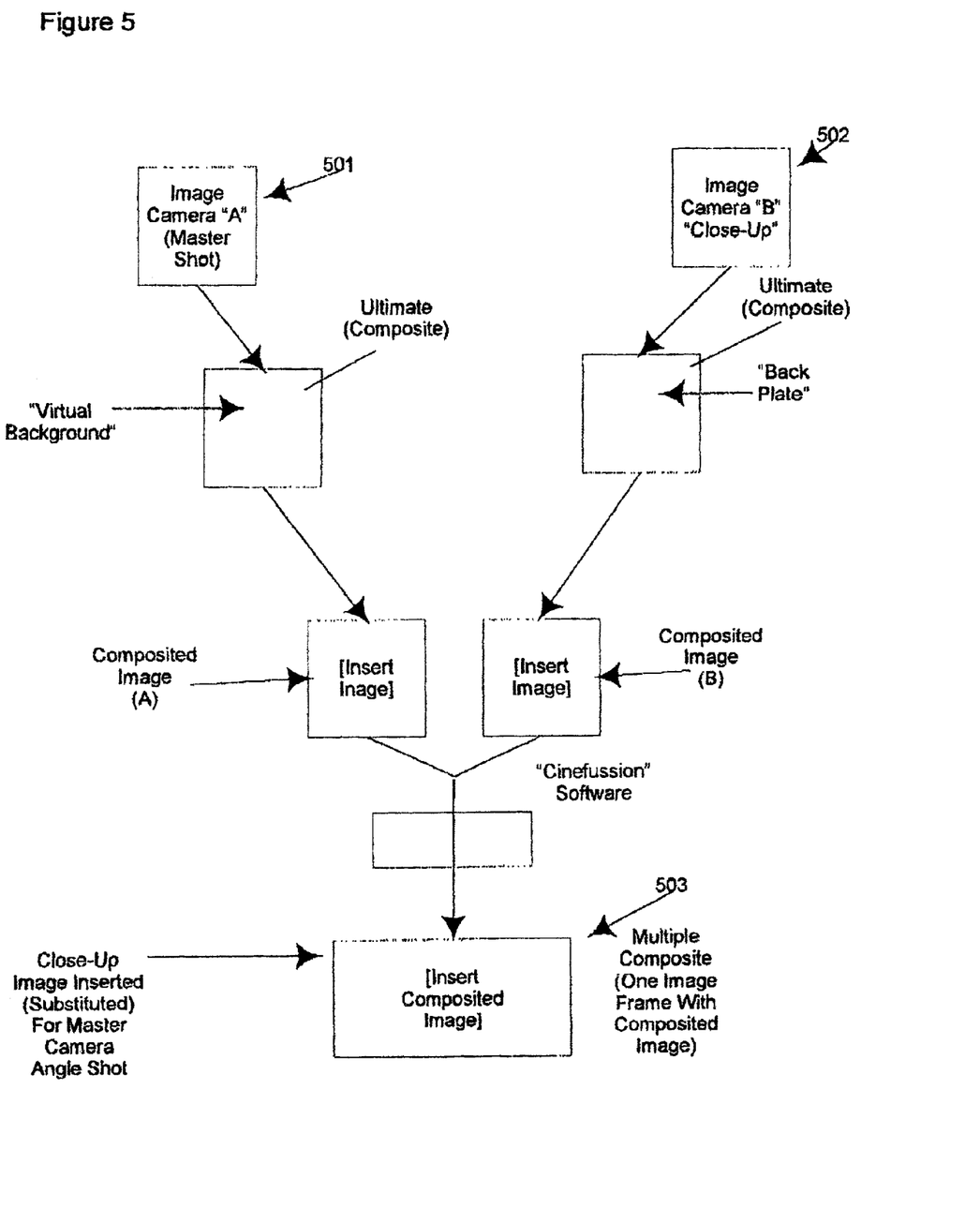
FIG. 5 depicts the system and method of this invention for compositing of a master shot of an action image of a puppet character with a close-up shot of the same puppet character.

Referring now to FIG. 5, there is illustrated a representative pair of images composited in accordance with FIG. 4. Each of the still frames images 501 & 502 of the same puppet character are initially recorded with different cameras 401 & 402 ("A" & "B") from a different camera angle on the virtual studio set. In each instance, still frame images 501& 502 are initially composited with a virtual image and a back plate image, respectively, in accordance with the basic key-color processes and methods of FIGS. 1–3. Each of these composited images are further combined with one another, in accordance with the processes and methods of FIG. 4, to form image 503. When this multiple composite image appears within an action sequence of the puppet character (filmed from the master shot camera angle), the film sequence is energized by the close-up. As above noted, the master camera angle position data is essential to match the close-up with the virtual background of the master shot, and, thus, the proper compositing of the close-up image with the virtual background in the master shot image scene. As is evident from these images, the inclusion of a close-up image, taken from a different camera angle, has the effect of bringing the audience into the scene and thus enhancing the life-like movement of the puppet character.

Figure 6:
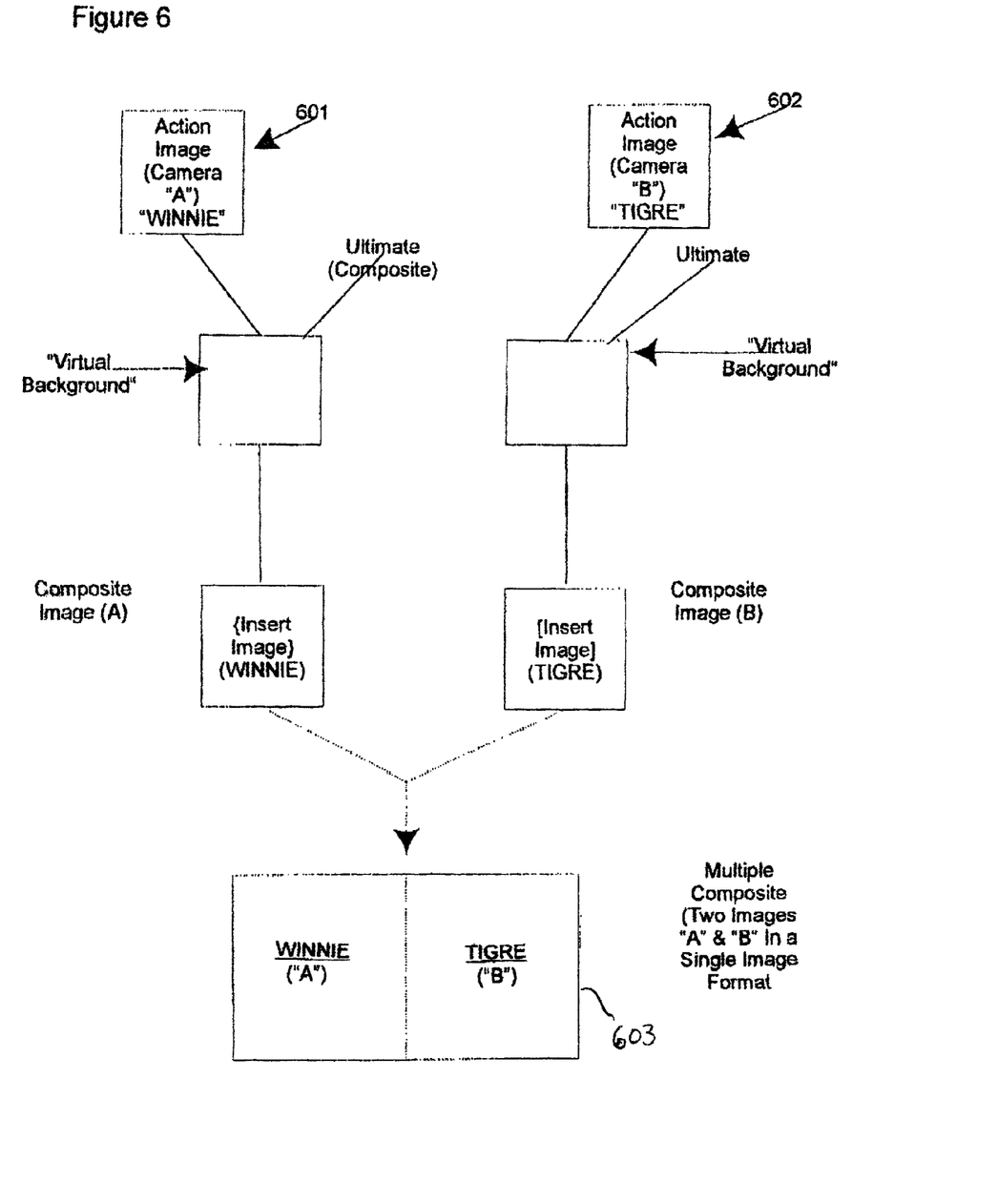
FIG. 6 depicts the system and method for integration of two complimentary or interactive action images of different puppet characters within the same image frame.

Referring now to FIG. 6, there is illustrated a representative illustration of the processes and methods of FIGS. 4 & 5, adapted to the multiple compositing of images of different puppet characters within a single image frame or series of image frames of an action sequence. In the illustration selected for inclusion herein, each of action images 601 and 602, that are integrated within image frame 603, provide complimentary or interactive footage of each distinct character within the same scene. More specifically, each of cameras 401 & 402 are used to film different characters, on the same virtual studio set, at different times; or, the concurrent filming of complimentary or interactive puppet characters, on a duplicate virtual studio set, at the same time. Such independent filming of these characters eliminates the puppeteer congestion that would occur if an effort were made to concurrently animate and record complimentary or interactive puppet character action on the same virtual studio set at the same time. In addition, the use of two cameras provides a substantial savings in the time for shooting a particular scene, as well as production expenses. The system and method illustrated in FIG. 6 avoids this potential conflict and congestion, by separately filming complimentary and interactive action sequences of different puppet characters. In FIG. 6, two action sequences 601 & 602 are independently recorded within a virtual production studio, the recorded images composited with a suitable virtual background image and thereafter integrated within single image frame 603 by means of software available from Ultimatte Corporation (Cinefusoin™). Because the two action sequences are recorded separately, and preferably on the same set of the same or duplicate virtual studio set, the same camera may be available for each of these two recorded action sequences. The relative size of each of the combined images can be adjusted within the image frame to provide perspective and depth to the image frame by varying the size of one image relative to the other to provide depth or other visual effects. This integration or multiple compositing of two action images, within the same image frame, permits the complimentary or interactive sequences to be combined within the same scene without the puppeteer congestion that would have resulted from their concurrent production on the same virtual studio set.

The description appearing herein has, for simplicity of illustration and understanding, been made in reference to the accompanying figures, which depict the coordinated manipulation of a puppet by a number of puppeteers; and, the subsequent compositing of the real/action image with one or more virtual images. Notwithstanding, it is understood that further compositing of the images attained herein is not only possible but also contemplated within the scope of this invention, specifically, the compositing of the composite images of FIGS. 2, 5 and/or 6 with yet another real/action image (e.g. a live actors or with a animated image of other characters).

What is claimed is:

1. In a cinematographic system for creation of a film and/or video production, wherein the action figures are controlled by rods manipulated by puppeteers on a virtual production set, the improvement comprising:

a virtual production set, including a key-colored background screen, a stage, and at least one action puppet character manipulated by puppeteers on said virtual production set;

said action puppet character being positioned on a support structure, said support structure being arranged to provide a desired vertical location on said key-colored background screen for said action puppet character, and including the use of diffused lighting in said support structure to eliminate shadows on said virtual production set;

at least two (2) cameras, each of said cameras being positioned relative to an action puppet character to record, in real-time, at least two action images of said puppet character, or two different puppet characters on said virtual production set, each of said two action images of said puppet character being taken at the same time from a different camera angle, one image being a close-up shot and one image being a master shot and each of said two action images of said two different puppet characters being taken at different times on the same virtual production set or at the same time on two separate but identical virtual production sets;

means for recording the position of the camera taking the master shot image within the virtual production set relative to the action puppet character;

means for simultaneously compositing each of said real-time images with the master shot image being composited with a suitable virtual background image and the close-up shot image being composited with a digitally created still image; and means for simultaneously compositing each of said composited images in a multiple composite image, said composite images being integrated by separate compositing modules, so that each composited image appears within an allocated portion of a given image frame, and each allocated portion of said image frame being adjusted relative to one another to create depth and/or perspective of one composited image relative to the other, said allocated portion of said image frame being adjusted relative to one another to create interaction and/or complimentary action of one puppet character, or puppet character image, from one composited image with another puppet character, or puppet character image, from another composited image with a given image frame.

2. In a method for the production of an action cinematographic composition wherein action figures, which are included in the production, are puppets controlled by rods which are manipulated by puppeteers on a virtual production set, the improvement comprising:

providing a virtual production set, including a key-colored background screen, a stage and at least one action puppet character manipulated by puppeteers on said virtual production set;

providing at least two (2) cameras, each of said cameras being positioned relative to an action puppet character to record, in real-time, at least two images of said puppet character, or two different puppet characters, on said virtual production set, each of said two images of said puppet character being taken at the same time from a different cameral angle, one image being a close-up shot and one image being a master shot and each of said two images of said two different puppet characters being taken at different times on the same virtual production set or at the same time on two separate but identical virtual production sets;

positioning said action puppet character on a support structure in front of said key-color background screen to provide a desired vertical location for said action puppet character on said key-color background screen;

providing diffused lighting in said support structure in order to eliminate shadows on said virtual production set;

simultaneously recording said action image or image sequence of said puppet character or characters with each of said cameras, recording the position of the camera taking the master shot image within the virtual production set relative to the action puppet character;

simultaneously compositing the master shot image with a suitable virtual background image and the close-up shot image with a digitally created still image; and simultaneously compositing each of said composited images with one another in a multiple composite image, wherein said compositing step comprises integrating each of said composite images from a separate compositing module, so that each composited image appears within an allocated portion of a given image frame, and each allocated portion of said image frame is adjusted relative to one another to adjust the depth and/or perspective of one composited image relative to the other, and allocating a portion of said image frame relative to one another portion of said image frame so as to create interaction and/or complimentary action of one puppet character, or puppet character image, from one composited image with another puppet character or puppet character image from another composited image with a given image frame.

* * * * *